United States Patent
Kern

(10) Patent No.: US 11,577,802 B2
(45) Date of Patent: Feb. 14, 2023

(54) MOTORIZED BICYCLE TRAINING WHEEL SYSTEM

(71) Applicant: Daniel Kern, Port St Lucie, FL (US)

(72) Inventor: Daniel Kern, Port St Lucie, FL (US)

( * ) Notice: Subject to any disclaimer, the term of this patent is extended or adjusted under 35 U.S.C. 154(b) by 184 days.

(21) Appl. No.: 17/082,228

(22) Filed: Oct. 28, 2020

(65) Prior Publication Data

US 2022/0126946 A1 Apr. 28, 2022

(51) Int. Cl.
*B62M 6/40* (2010.01)
*B62H 1/12* (2006.01)
*B62J 43/13* (2020.01)
*B62K 23/04* (2006.01)
*B62M 6/90* (2010.01)
*B62J 43/20* (2020.01)
*B62H 7/00* (2006.01)

(52) U.S. Cl.
CPC ............ *B62M 6/40* (2013.01); *B62H 1/12* (2013.01); *B62H 7/00* (2013.01); *B62J 43/20* (2020.02); *B62K 23/04* (2013.01); *B62M 6/90* (2013.01); *B62J 43/13* (2020.02)

(58) Field of Classification Search
CPC . B62M 6/40; B62M 6/90; B62M 6/45; B62H 1/12; B62H 7/00; B62J 43/20; B62J 43/13; B62J 11/04; B62K 23/04; B62K 2204/00
See application file for complete search history.

(56) References Cited

U.S. PATENT DOCUMENTS

| | | | |
|---|---|---|---|
| 3,877,727 A | 4/1975 | Johannsen | |
| 3,921,741 A | 11/1975 | Garfinkle | |
| 4,267,898 A | 5/1981 | Wheaton | |
| 5,352,403 A | 10/1994 | Egley | |
| D369,331 S | 4/1996 | Niemeyer | |
| 6,497,299 B1 | 12/2002 | Sinclair | |
| 6,676,150 B1* | 1/2004 | Goldstein | B62H 1/12 280/217 |
| 8,573,346 B2 | 11/2013 | Deigen | |
| 2018/0222549 A1* | 8/2018 | Ragland | B62J 43/13 |
| 2020/0317281 A1* | 10/2020 | Kamler | B62H 1/12 |

FOREIGN PATENT DOCUMENTS

WO WO0050298 8/2000

\* cited by examiner

*Primary Examiner* — Jacob B Meyer
*Assistant Examiner* — Michael R Stabley

(57) ABSTRACT

A motorized bicycle training wheel system for training people to ride a bike without pedaling includes a pair of motorized training wheels each comprising an attachment bracket, a motor, and a wheel. The attachment bracket has an attachment aperture to receive an axle of a bicycle. The motor has a motor housing coupled to a lower portion of the attachment bracket. The wheel is coupled to a drive shaft of the motor. A battery is in operational communication with the motor of each of the pair of motorized training wheels and coupled to a frame of the bicycle. A throttle is in operational communication with the battery and the motor of each of the pair of motorized training wheels and coupled to a handlebar of the bicycle.

8 Claims, 4 Drawing Sheets

MOTORIZED BICYCLE TRAINING WHEEL SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to bicycle training wheel devices and more particularly pertains to a new bicycle training wheel device for training people to ride a bike without pedaling.

(2) Description of Related Art Including Information Disclosed Under 37 CFR 1.97 and 1.98

The prior art relates to bicycle training wheel devices. Some existing devices may attach to any bicycle for stability, while other devices may attach to any bicycle to motorize one of the main wheels. No existing devices add motorized wheels which also make the bicycle fully stabilized.

BRIEF SUMMARY OF THE INVENTION

An embodiment of the disclosure meets the needs presented above by generally comprising a pair of motorized training wheels. Each motorized training wheel comprises an attachment bracket, a motor, and a wheel. The attachment bracket has an attachment aperture extending through an upper portion. The attachment aperture is configured to receive an axle of a bicycle. An extension portion is coupled to the upper portion and a lower portion is coupled to the extension portion. The motor has a motor housing coupled to the lower portion of the attachment bracket. The wheel is coupled to a drive shaft of the motor. A battery is in operational communication with the motor of each of the pair of motorized training wheels. The battery is configured to be coupled to a frame of the bicycle. A throttle is in operational communication with the battery and the motor of each of the pair of motorized training wheels. The throttle is configured to be coupled to a handlebar of the bicycle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
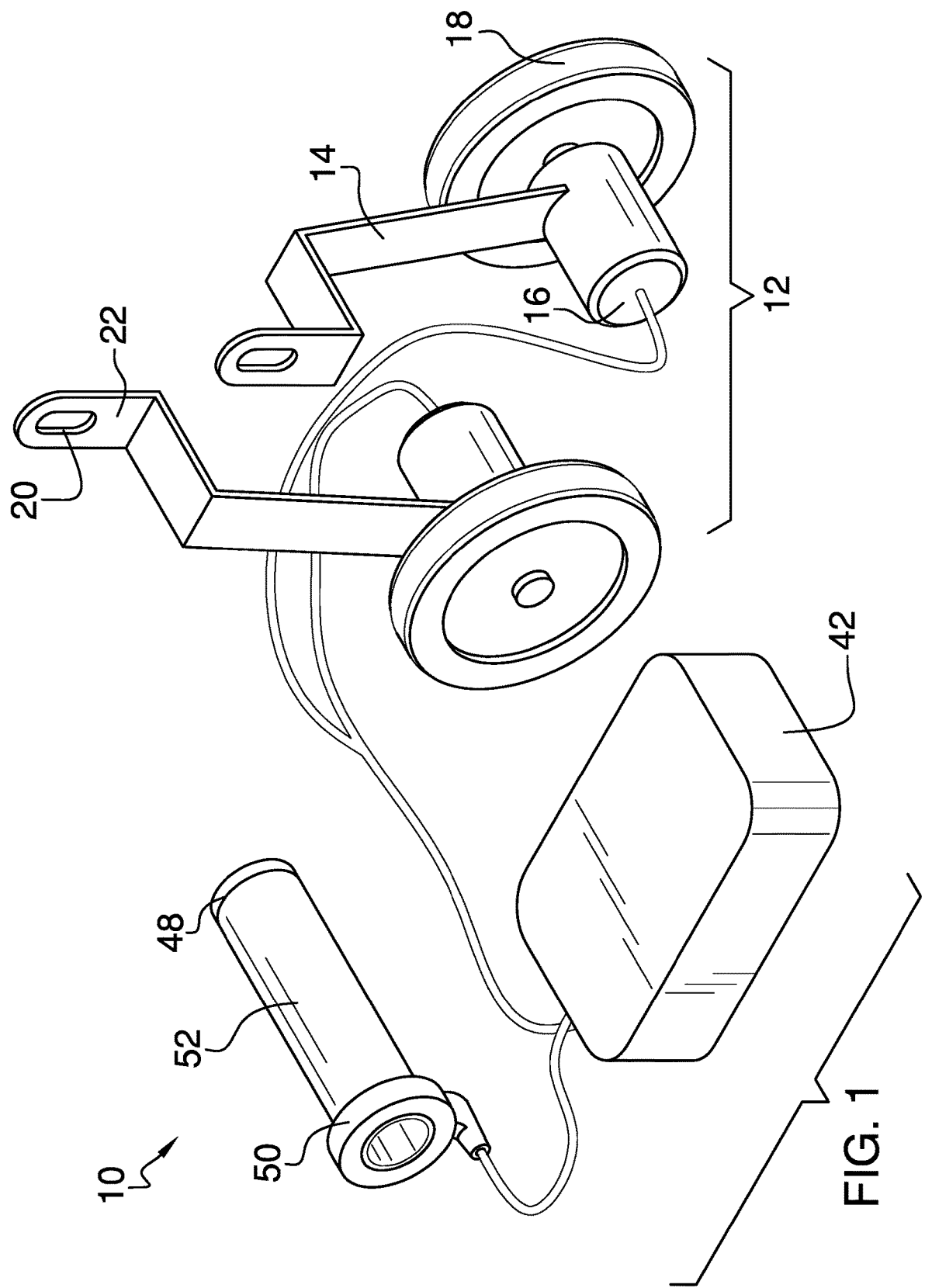
FIG. 1 is an isometric view of a motorized bicycle training wheel system according to an embodiment of the disclosure.
Figure 2:
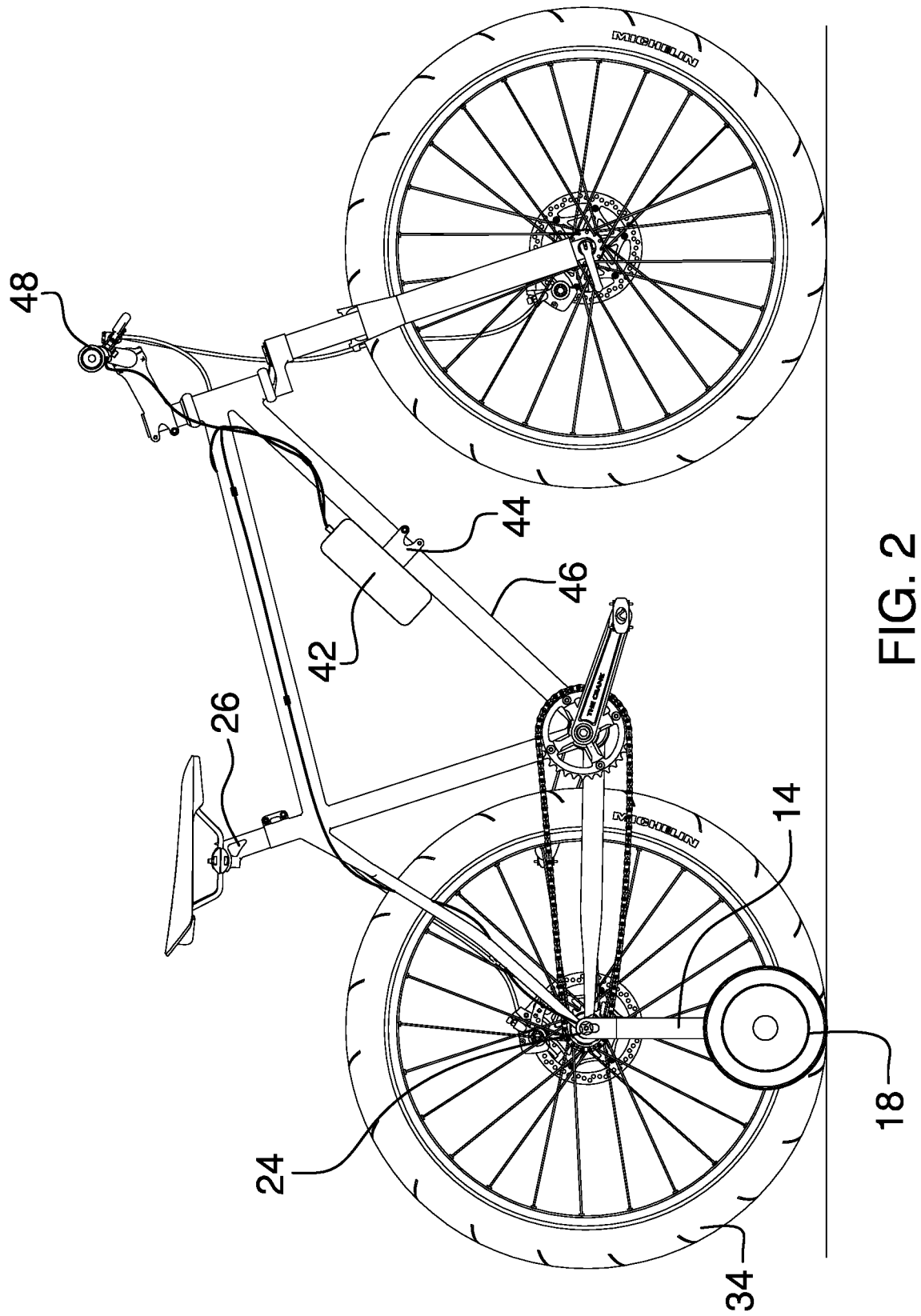
FIG. 2 is a side elevation in-use view of an embodiment of the disclosure.
Figure 3:
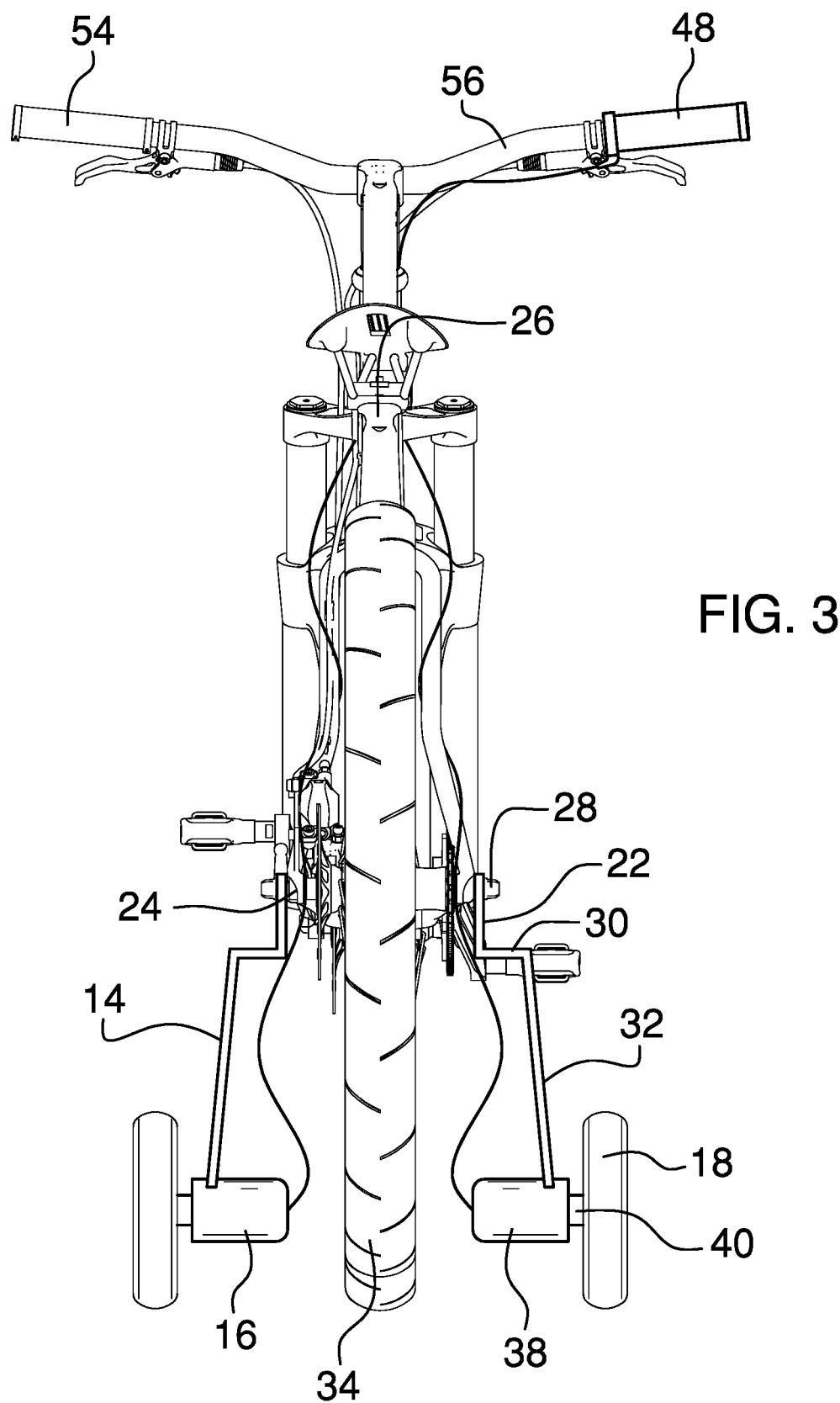
FIG. 3 is a rear elevation in-use view of an embodiment of the disclosure.
Figure 4:
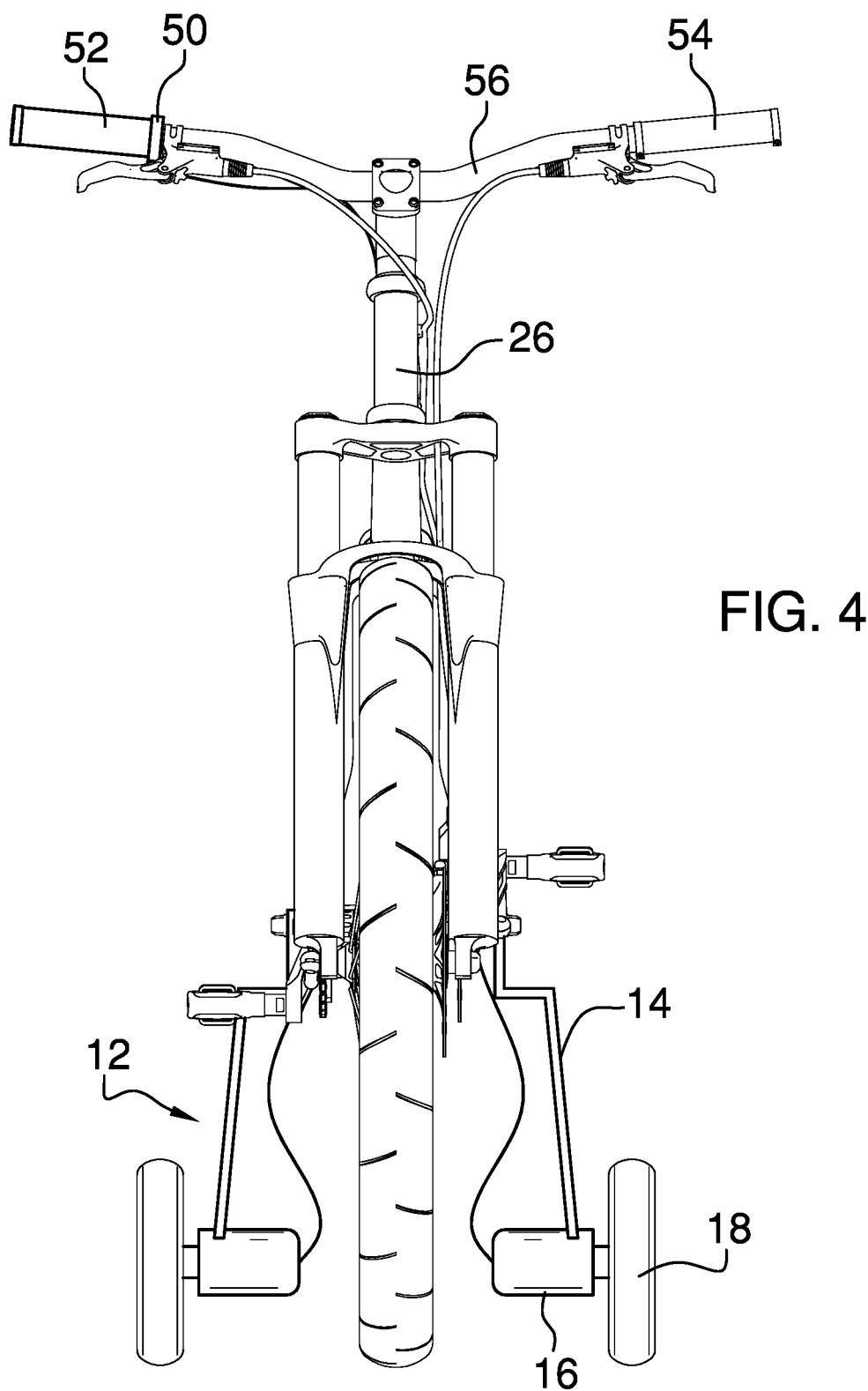
FIG. 4 is a front elevation in-use view of an embodiment of the disclosure.

With reference now to the drawings, and in particular to FIGS. 1 through 4 thereof, a new bicycle training wheel device embodying the principles and concepts of an embodiment of the disclosure and generally designated by the reference numeral 10 will be described.

As best illustrated in FIGS. 1 through 4, the motorized bicycle training wheel system 10 generally comprises a pair of motorized training wheels 12 each comprising an attachment bracket 14, a motor 16, and a wheel 18. The attachment bracket 14 may have an obround attachment aperture 20 extending through an upper portion 22. The attachment aperture 20 is configured to receive an axle 24 of a bicycle 26. The axle 24 may be positioned within the obround attachment aperture 20 before being secured in place with a wheel nut 28 to adjust a height of the wheel 18.

An extension portion 30 of the attachment bracket is coupled to the upper portion 22 and a lower portion 32 is coupled to the extension portion 30. The upper portion 22 and the extension portion 30 may be perpendicular to create separation from the bicycle and the extension portion 30 and the lower portion 32 may form an angle greater than 90° to position the motor 16 and the wheel 18 away from a rear tire 34 of the bicycle and adjacent the ground. The motor 16 has a motor housing 38 coupled to the lower portion 32 of the attachment bracket. The wheel 18 is coupled to a drive shaft 40 of the motor.

A battery 42 is in operational communication with the motor 16 of each of the pair of motorized training wheels 12. The battery 42 may have a battery attachment clip 44 that is configured to selectively engage a frame 46 of the bicycle. The battery 42 may alternatively fit within a water bottle holder of the bicycle 26. The battery 42 is rechargeable and may be rectangular prismatic with rounded edges.

A throttle 48 is in operational communication with the battery 42 and the motor 36 of each of the pair of motorized training wheels. The throttle 48 controls the amount of power provided from the battery 42 to each motor 16 to adjust a speed at which the pair of motorized training wheels 12 drives the bicycle 26. The throttle 48 may have a handle grip portion 50 and a twist portion 52 rotatably coupled to the handle grip portion 50. The handle grip portion 50 is configured to replace a hand grip 54 on a handlebar 56 of the bicycle. The throttle 48 may alternative be a thumb lever that clips on to the handlebar 56 adjacent the handle grip 54.

In use, the user can practice riding the bicycle 26 without having to pedal by using the throttle 48 to control power to the pair of motorized training wheels 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A motorized bicycle training wheel system comprising:
   a pair of motorized training wheels, each motorized training wheel comprising:
      an attachment bracket, the attachment bracket having an attachment aperture extending through an upper portion, the attachment aperture being configured to receive an axle of a bicycle, an extension portion coupled to the upper portion, and a lower portion coupled to the extension portion;
      a motor coupled to the attachment bracket, the motor having a motor housing coupled to the lower portion of the attachment bracket; and
      a wheel coupled to the motor, the wheel being coupled to a drive shaft of the motor, wherein the wheel is configured to contact a ground surface;
   a battery, the battery being in operational communication with the motor of each of the pair of motorized training wheels, the battery being configured to be coupled to a frame of the bicycle; and
   a throttle, the throttle being in operational communication with the battery and the motor of each of the pair of motorized training wheels, the throttle being configured to be coupled to a handlebar of the bicycle.

2. The motorized bicycle training wheel system of claim 1 further comprising the throttle having a handle grip portion and a twist portion rotatably coupled to the handle grip portion, the handle grip portion being configured to replace a hand grip on the handlebar of the bicycle.

3. The motorized bicycle training wheel system of claim 1 further comprising the upper portion and the extension portion being perpendicular and the extension portion and the lower portion forming an angle greater than 90°.

4. The motorized bicycle training wheel system of claim 1 further comprising the attachment aperture being obround.

5. The motorized bicycle training wheel system of claim 1 further comprising the battery having a battery attachment clip, the battery attachment clip being selectively engageable with the frame of the bicycle.

6. The motorized bicycle training wheel system of claim 1 further comprising the battery having rounded edges.

7. A motorized bicycle training wheel system comprising:
   a pair of motorized training wheels, each motorized training wheel comprising:
      an attachment bracket, the attachment bracket having an obround attachment aperture extending through an upper portion, the attachment aperture being configured to receive an axle of a bicycle, an extension portion coupled to the upper portion, and a lower portion coupled to the extension portion, the upper portion and the extension portion being perpendicular and the extension portion and the lower portion forming an angle greater than 90°;
      a motor coupled to the attachment bracket, the motor having a motor housing coupled to the lower portion of the attachment bracket; and
      a wheel coupled to the motor, the wheel being coupled to a drive shaft of the motor, wherein the wheel is configured to contact a ground surface;
   a battery, the battery being in operational communication with the motor of each of the pair of motorized training wheels, the battery having a battery attachment clip, the battery attachment clip being configured to selectively engage a frame of the bicycle; and
   a throttle, the throttle being in operational communication with the battery and the motor of each of the pair of motorized training wheels, the throttle having a handle grip portion and a twist portion rotatably coupled to the handle grip portion, the handle grip portion being configured to replace a hand grip on a handlebar of the bicycle.

8. A bicycle and motorized bicycle training wheel system comprising:
   a bicycle;
   a pair of motorized training wheels, each motorized training wheel comprising:
      an attachment bracket, the attachment bracket having an obround attachment aperture extending through an upper portion, the attachment aperture receiving an axle of the bicycle, an extension portion coupled to the upper portion, and a lower portion coupled to the extension portion, the upper portion and the extension portion being perpendicular and the extension portion and the lower portion forming an angle greater than 90°;
      a motor coupled to the attachment bracket, the motor having a motor housing coupled to the lower portion of the attachment bracket; and
      a wheel coupled to the motor, the wheel being coupled to a drive shaft of the motor, wherein the wheel is configured to contact a ground surface;
   a battery, the battery being in operational communication with the motor of each of the pair of motorized training wheels, the battery having a battery attachment clip, the battery attachment clip selectively engaging a frame of the bicycle; and a throttle, the throttle being in operational communication with the battery and the motor of each of the pair of motorized training wheels, the throttle having a handle grip portion and a twist portion rotatably coupled to the handle grip portion, the handle grip portion being coupled to a handlebar of the bicycle.

\* \* \* \* \*